US005302565A

United States Patent [19]

Crowe

[11] Patent Number: 5,302,565

[45] Date of Patent: Apr. 12, 1994

[54] CERAMIC CONTAINER

[76] Inventor: General D. Crowe, 111 Belmont Cir., Easley, S.C. 29640

[21] Appl. No.: 946,078

[22] Filed: Sep. 18, 1992

[51] Int. Cl.[5] .......................... C01B 33/00; G21F 9/16

[52] U.S. Cl. .................................... 501/141; 501/155; 252/627; 252/633; 250/506.1; 976/DIG. 385

[58] Field of Search ................ 252/629, 633; 588/252; 976/DIG. 385; 250/506.1; 501/155, 141

[56] References Cited

U.S. PATENT DOCUMENTS

| | | | |
|---|---|---|---|
| 3,093,593 | 6/1963 | Arrance | 252/629 |
| 3,110,557 | 11/1963 | Spector | 252/629 |
| 3,167,504 | 1/1965 | Hayden et al. | 210/633 |
| 3,213,031 | 10/1965 | Heinemann et al. | 252/629 |
| 3,849,330 | 11/1974 | Isaacson et al. | 252/629 |
| 3,900,329 | 8/1975 | Grubb et al. | 106/52 |
| 3,900,415 | 8/1975 | Lee et al. | 252/62.51 |
| 3,959,172 | 5/1976 | Brownell et al. | 252/626 |
| 4,028,265 | 6/1977 | Barney et al. | 252/626 |
| 4,101,330 | 7/1978 | Burk et al. | 106/45 |
| 4,116,705 | 9/1978 | Chappell | 106/90 |
| 4,404,129 | 9/1983 | Penberthy et al. | 252/629 |
| 4,476,235 | 10/1984 | Chevalier-Bultel | 501/112 |
| 4,512,809 | 4/1985 | Nielsen et al. | 106/103 |
| 4,518,508 | 5/1985 | Conner | 210/751 |
| 4,632,778 | 12/1986 | Lehto et al. | 252/629 |

*Primary Examiner*—Peter A. Nelson
*Assistant Examiner*—Ngoclan T. Mai
*Attorney, Agent, or Firm*—Low and Low

[57] ABSTRACT

A leach-resistant vitrified composition, particularly suitable for long term encapsulation and disposal of nuclear wastes, comprises a high iron, high potassium aluminosilicate, fired at a temperature of at least 1850° F. for at least 12 h.

6 Claims, No Drawings

CERAMIC CONTAINER

TECHNICAL FIELD

This invention relates to ceramic containers, particularly those made from shale or clay and the method for making same. The invention further relates to containers which are leach-proof and, therefore, ideally suited for groundwater control by the containment and burial of nuclear wastes.

BACKGROUND ART

A problem facing the nuclear industry which has received much attention is how to dispose of nuclear so that they will not contaminate the environment with radioactivity.

In the past, methods have been offered for the fixation of radioactive materials in non-radioactive solids of low water leachability, such as the incorporation of fission by-products in glass, ceramic glaze, or rock-like materials. Examples of such methods are disclosed by Arrance in U.S. Pat. No. 3,093,593 and Spector in U.S. Pat. No. 3,110,557. However, since these methods require high temperature for the fixation reaction, the lower boiling metal oxides, some of which possess a high level of radioactivity, escape from the system. Similarly, Conner, in U.S. Pat. No. 4,518,508 solidified nuclear wastes by mixing with a dry water-reactive solidification agent comprising cement, a dry water absorbent material and a powdered alkali metal silicate. But, none of these methods provide an outer layer of non-radioactive material. In U.S. Pat. No. 4,404,129, Penberthy et al. teach a non-radioactive outer layer, but, again, this method requires heating of the nuclear wastes to high temperatures.

Heinemann et al. in U.S. Pat. No. 3,213,031 teach of containing nuclear wastes in a vessel and then coating the vessel with a sealant comprising a solid, non-radioactive mixture of a metal oxide and an elemental metal. That method, however, does not allow for prior production of completed vessels, nor does it necessarily utilize readily available starting products.

DESCRIPTION OF THE INVENTION

It is an object of this invention to provide a highly durable ceramic with a low porosity.

It is a further object of this invention to provide a non-leaching container made from a naturally occurring clay.

It is still a further and yet more particular object of this invention to provide a means for disposing of nuclear wastes without contamination of groundwater. In addition to disposing of nuclear wastes, other undesirable materials including those considered to be hazardous wastes may also be disposed of.

These as well as other objects are accomplished by providing a vitrified composition comprising a high iron, high potassium aluminosilicate, fired at a temperature of at least 1800° F. for at least 12 h.

In another aspect, this invention relates to containers made from the foregoing vitrified composition, which containers are of low permeability and are particularly useful for the encapsulation and storage of radioactive wastes.

This invention further relates to a method for making a container for encapsulation and burial of nuclear wastes for long term disposal, comprising the steps of:

1. grinding a high potassium, high iron aluminosilicate clay to a particle size suitable for forming a castable slip;
2. mixing the thus-ground aluminosilicate with water in an amount adequate to provide a flowable slip;
3. casting a container from the thus-made slip; and
4. firing the thus-cast container at temperatures above about 1800° F. for at least 12 h to provide a container with glazed surfaces.

This invention relates generally to the art of hazardous waste management and particularly to the formation of a vitrified ceramic container from a natural resource for long term disposal of nuclear wastes. That natural resource is a naturally occurring clay or shale, preferably roan red shale. "Vitrified", as used in the specification and claims, means converted from a siliceous material (like a natural clay) to an amorphous glassy form by melting and cooling. Roan red shale or clay is an aluminosilicate which is naturally high in iron and high in potassium.

The shale, preferably ground to a 200 mesh, is mixed with water forming a castable slip. The slip is molded and then fired to produce the ceramic. Additives, including sodium carbonate and sodium silicate, may be added to the slip to increase flowability but are not required.

For testing purposes two ceramic materials were fabricated from the simple slip of shale and water. One was fired to 2100° F. at a rate of 100° per hour with a 12 hour hold at 1800° F. The other was fired to 2300° F. at a rate of 100° per hour with a 12 hour hold at 1800° F. While some samples exhibiting acceptable porosity levels (below about 3.8%) were obtained by firing with a hold at maximum temperature of 15 hours, it was determined that a 12 hour hold at maximum temperature produced a stronger ceramic. The compositions of the ceramics were determined by HCl/HF and $Na_2O_2$ dissolutions, followed by multielement inductively coupled plasma (ICP) analysis. The two ceramics were found to be primarily potassium - iron rich aluminosilicates.

To measure the relative durabilities of the two ceramics the hydration free energy was calculated from the chemical compositions. It has been found that the relative durability of natural and man-made glasses, including glass ceramics, is quantified by comparison of the relative thermodynamic stabilities expressed as the free energy of hydration. The thermodynamic calculations assume that the overall free energy of hydration, $G_{hyd}$, is a function of composition, e. g. an additive function of the free energies of hydration of the individual silicate and oxide components. The thermodynamically most stable hydration reaction is written for each component, $(G_{hyd})i$ and its contribution to the overall hydration term weighted by the mole fraction present, $x_i$, so that $$G_{hyd} = x_i (G_{hyd})_i \quad (1)$$

If a stable hydration product is observed on a leached glass surface and if this hydration reaction has a higher free energy of formation, then its $(G_{hyd})i$ value is substituted in Eq. (1).

The relative durability, predicted from thermodynamic calculations, correlates directly with the experimentally observed release of silicon to the leaching solution in short-term laboratory tests.

The calculated hydration free energy ranged from −0.71 kcal/mole for the low temperature ceramic to −0.21 kcal/mole for the high temperature ceramic. The more positive the calculated hydration free energy the more durable the material. Silica, alumina and ferric iron all give positive contributions to the calculated term. Although the $Fe^{2+}/Fe^{3+}$ ratio of the material was not determined, a red color is indicative that most, if not all the iron, is present at $Fe_2O_3$. Generally the aluminosilicate was found to contain 9.35–11.88% by weight of $Fe_2O_3$ with 9.89–11.34% by weight of $K_2O$. The high $SiO_2$, $Al_2O_3$ and $Fe_2O_3$ content of this ceramic is responsible for its durability.

No excursions in pH to more basic regimes were observed during a 28 day durability test. The releases of Si to solution in ppm were slightly lower, 5.60 and 4.33, for the low temperature ceramic than for the higher temperature ceramic which released 8.73 and 10.20 ppm Si.

The elemental value of the silicon released is normalized to the mass fraction of silicon in the ceramic and is a function of the exposed surface area and the leachate volume according to:

$$NL_i = \frac{M_i}{F_i \cdot SA} \quad (2)$$

where $NL_i$ = normalized elemental mass loss ($g.m^{-2}$), $M_i$ = mass of element "i" in the leachate (g), $F_i$ = fraction of element "i" in the unleached waste form, SA = specimen surface area ($m^2$).

The normalized releases of silicon to the solution range from 1.74 to 4.15 $g/m^2$.

The x-ray diffraction analysis of this material indicated that it is a mixture of potassium feldspar ($KAlSi_3O_8$), hematite ($Fe_2O_3$) and quartz ($SiO_2$).

DESCRIPTION OF A PREFERRED EMBODIMENT

From the foregoing it is shown that a durable ceramic exhibiting an extremely low porosity may be easily fabricated from a natural resource. The following examples illustrate the preparation as well as the permeability and strength of the preferred embodiment of that ceramic. For testing purposes the ceramic is prepared as bars rather than containers.

EXAMPLE 1

1. A 200-mesh sample of the shale was mixed with 60° wt.% water, 0.5 wt.% $Na_2O$ to produce a castable slip. The slip was then cast in 1" ×1" ×6 " plaster molds which were allowed to set up overnight.

2. The molds were evacuated the next morning and the bars were allowed to air dry for 24 hours.

3. Following air drying, the bars were dried at 210° F. for 12 hours.

4. The bars were fired to 2100° F. at a rate of 100° per hour with a 12 hour hold at 1800° F.

EXAMPLE 2

Apparent porosity calculations were based on the following formula:

$$P = (W - D)/(W - S)$$

D = Dry weight

W = Saturated weight (after boiling in water for 5

S = Suspended weight (after boiling in water for 5

Strength calculations were based on the following formula for Modulus of Rupture (MOR):

$$MOR = 3PL/2db2$$

P = Load at fracture

L = Length of span b = breadth of sample d = depth of sample

RESULTS:

Porosity:

| Sample No. | W | D | S | P |
|---|---|---|---|---|
| 1 | 123.4 | 121.5 | 73.2 | 3.8% |
| 2 | 115.3 | 114.1 | 66.4 | 2.3% |
| 3 | 121.4 | 120.4 | 70.65 | 2.1% |
| 4 | 125.4 | 124.3 | 74.5 | 2.2% |
| 5 | 123.1 | 122.2 | 73.4 | 1.9% |
| 6 | 110.2 | 109.0 | 61.4 | 2.54 |
| 7 | 132.3 | 131.2 | 76.1 | 2.03% |
| 8 | 130.9 | 129.9 | 74.3 | 1.87% |
| 9 | 122.4 | 121.2 | 72.2 | 2.47% |
| 10 | 126.3 | 125.0 | 75.2 | 2.52 |

With an average apparent porosity of 2.37%, the fired samples are well within the range of porosity of industrial porcelains.

Strength:

| Sample No. | Load (Lb) | MOR (PSI) |
|---|---|---|
| 1 | 175 | 787.5 |
| 2 | 138 | 621.0 |
| 3 | 100 | 450 |
| 4 | 154 | 693 |
| 5 | 169 | 760.5 |
| 6 | 120 | 540 |
| 7 | 182 | 819 |
| 8 | 145 | 652.5 |
| 9 | 115 | 517.5 |
| 10 | 164 | 738.0 |

While a preferred embodiment of the invention has been described using specific terms, such description is for illustrative purposes only, and it is to be understood that changes and variations may be made without departing from the spirit or scope of the following claims.

What is claimed is:

1. A vitrified composition, comprising a high iron, high potassium aluminosilicate, fired at a temperature of at least 1800° F. for at least 12 hours, wherein the aluminosilicate contains at least 9.35% by weight of $Fe_2O_3$.

2. A vitrified composition, comprising a high iron, high potassium aluminosilicate, fired at a temperature of at least 1800° F. for at least 12 hours, wherein the aluminosilicate contains 9.35%–11.88% by weight of $Fe_2O_3$.

3. A composition comprising naturally occurring red roan shale clay inherently having iron and potassium aluminosilicate component and fired at a temperature of at least 1800° F. for at least 12 hours, the composition being a pressed and fired said shale and including a mixture of feldspar, hematite and quartz, the aluminosilicate component of said clay containing:

at least 9.89% by weight $K_2O$; and at least 9.35% by weight $Fe_2O_3$.

4. The composition of claim 3, wherein said aluminosilicate contains 9.89%–11.34% by weight $K_2O$.

5. The composition of claim 3, wherein said aluminosilicate contains 9.35%-11.88% by weight $F_{e2}O_3$.

6. A container for the encapsulation of nuclear wastes made from a composition comprising naturally occurring red roan shale clay inherently having an iron/-potassium aluminosilicate component and fired at a temperature of at least 1800° F. for at least 12 hours, the composition being a pressed and fired said shale and including a mixture of feldspar, hematite and quartz, the aluminosilicate component of said clay containing:

at least 9.89% by weight $K_2O$; and at least 9.35% by weight $Fe_2O_3$.

* * * * *